(12) United States Patent
Kuroda et al.

(10) Patent No.: US 11,655,360 B2
(45) Date of Patent: May 23, 2023

(54) GAS-BARRIER RESIN COMPOSITION AND USE THEREOF

(71) Applicants: SHOWA DENKO K.K., Tokyo (JP); JAPAN POLYETHYLENE CORPORATION, Tokyo (JP)

(72) Inventors: Junichi Kuroda, Oita (JP); Yoshikuni Okumura, Oita (JP); Shinya Hayashi, Oita (JP); Masahiro Uematsu, Kanagawa (JP); Takaaki Hattori, Kanagawa (JP); Yuichiro Yasukawa, Kanagawa (JP)

(73) Assignees: SHOWA DENKO K.K., Tokyo (JP); JAPAN POLYETHYLENE CORPORATION, Tokyo (JP)

( * ) Notice: Subject to any disclaimer, the term of this patent is extended or adjusted under 35 U.S.C. 154(b) by 335 days.

(21) Appl. No.: 16/624,055

(22) PCT Filed: Jul. 17, 2018

(86) PCT No.: PCT/JP2018/026766
§ 371 (c)(1),
(2) Date: Dec. 18, 2019

(87) PCT Pub. No.: WO2019/021890
PCT Pub. Date: Jan. 31, 2019

(65) Prior Publication Data
US 2021/0147669 A1 May 20, 2021

(30) Foreign Application Priority Data

Jul. 25, 2017 (JP) .............................. JP2017-143454
Dec. 19, 2017 (JP) .............................. JP2017-243014
Dec. 19, 2017 (JP) .............................. JP2017-243015

(51) Int. Cl.
*C08L 29/04* (2006.01)
*C08L 23/08* (2006.01)

(52) U.S. Cl.
CPC ............... *C08L 29/04* (2013.01); *C08L 23/08* (2013.01)

(58) Field of Classification Search
CPC ................ C08L 23/08–0892; C08L 29/02–06
See application file for complete search history.

(56) References Cited

U.S. PATENT DOCUMENTS 5,780,577 A 7/1998 Yamaguchi
2002/0156207 A1 10/2002 Imuta et al.

FOREIGN PATENT DOCUMENTS

| JP | 52-141785 A | 11/1977 |
|---|---|---|
| JP | 53-88067 A | 8/1978 |
| JP | 59-20345 A | 2/1984 |
| JP | 07-15059 B2 | 2/1995 |
| JP | 08-239528 A | 9/1996 |
| JP | 09-183900 A | 7/1997 |
| JP | 2000-212369 A | 8/2000 |
| JP | 2002-145947 A | 5/2002 |
| JP | 2006-241398 A | 9/2006 |
| JP | 2016-191009 A | 11/2016 |
| JP | 2017-31300 A | 2/2017 |

OTHER PUBLICATIONS

International Search report for PCT/JP2018/026766, dated Sep. 18, 2018.

*Primary Examiner* — Ana L. Woodward
(74) *Attorney, Agent, or Firm* — Sughrue Mion, PLLC

(57) ABSTRACT

A gas-barrier resin (A) having an oxygen permeability coefficient of $1.0\times10^{-14}$ (cm$^3$·cm/cm$^2$·s·Pa) or less; and a copolymer (B) containing monomer structural units represented by the formula (1), the formula (2), and the formula (3):

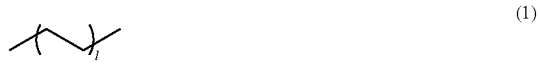

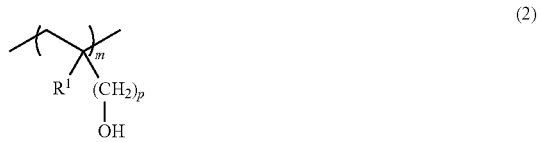

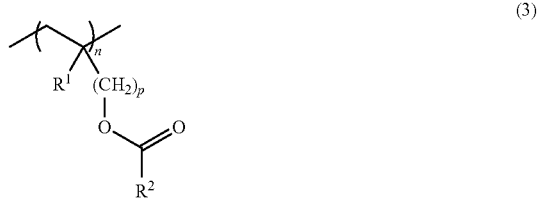

where: R$^1$ represents a hydrogen atom or a methyl group; R$^2$ represents a hydrocarbon group having 1 to 20 carbon atoms that may be substituted with a halogen atom, a hydroxy group, an alkoxy group, or an amino group; 1, m, and n represent numerical values representing molar proportions of the respective monomer structural units, and n may represent 0; and p represents an integer of from 1 to 4, wherein a ratio of a mass of the copolymer (B) to a total mass of the gas-barrier resin (A) and the copolymer (B) is from 1 mass % to 40 mass %.

12 Claims, No Drawings

GAS-BARRIER RESIN COMPOSITION AND USE THEREOF

CROSS REFERENCE TO RELATED APPLICATIONS

This application is a National Stage of International Application No. PCT/JP2018/026766 filed Jul. 17, 2018, claiming priority based on Japanese Patent Application No. 2017-143454 filed Jul. 25, 2017, Japanese Patent Application No. 2017-243014 filed Dec. 19, 2017 and Japanese Patent Application No. 2017-243015 filed Dec. 19, 2017.

TECHNICAL FIELD

The present invention relates to a gas-barrier resin composition improved in physical properties of a gas-barrier resin typified by a vinyl alcohol-based resin, a polyamide-based resin, or a polyester-based resin, a sheet, film, or container, such as a bag, a bottle, or a tank, containing the gas-barrier resin composition, and a method of modifying a gas-barrier resin composition.

BACKGROUND ART

A vinyl alcohol-based resin typified by polyvinyl alcohol (hereinafter sometimes abbreviatedly referred to as "PVOH"), an ethylene-vinyl alcohol copolymer (hereinafter sometimes abbreviatedly referred to as "EVOH"), or the like has an extremely strong intermolecular force because of formation of a hydrogen bond between hydroxy groups present in its polymer chain. Therefore, the vinyl alcohol-based resin has high crystallinity, and besides, has a high intermolecular force even in its amorphous moiety, and hence the vinyl alcohol-based resin shows high gas barrier properties. It is known that gas molecules of oxygen, nitrogen, and the like, a vapor of an organic solvent, and the like cannot easily permeate a molded article (barrier layer) molded using the vinyl alcohol-based resin.

In particular, the EVOH can be melt-molded and has high gas barrier properties, oil resistance, organic solvent resistance, transparency, and the like, and hence molded articles thereof (e.g., a film, a sheet, and a bottle container) are used in a wide range of fields, such as food packaging materials, pharmaceutical packaging materials, industrial chemical packaging materials, agrochemical packaging materials, and fuel containers.

However, the EVOH has high crystallinity and a high crystallization rate, and hence has drawbacks of being a hard and brittle resin, and being poor in flexibility. Accordingly, its processability for molding into, for example, a packaging material for a food or the like, in particular, its heat stretchability is low, and hence there are: a risk in that a crack may occur in the barrier layer at the time of the molding to reduce a yield of a product; and a risk in that a reduction in mechanical strength, reductions in gas barrier properties, or the like due to thickness unevenness may occur, causing a lack of quality stability. Further, there is also a problem in, for example, that when the EVOH is used as a packaging material or a molding material while being repeatedly bent, a crack or a pinhole easily occurs owing to bending fatigue or the like, with the result that its excellent performance cannot be kept.

In JP 53-088067 A (Patent Literature 1), there is a description of a method involving adding water or a plasticizer to a resin composition for forming a sheet or the like, containing the EVOH as a main component. In addition, in JP 52-141785 A (Patent Literature 2) and JP 59-20345 A (Patent Literature 3), there is a description of a method involving blending polyamide or an aromatic polyester into a resin composition for forming a sheet or the like, containing the EVOH as a main component. Each of the methods shows an improvement in flexibility, but reduces gas barrier properties to large extents. Accordingly, the original excellent gas barrier properties of the EVOH cannot be maintained.

An attempt to improve the above-mentioned processability has been made by blending various elastomers, such as an ethylene-vinyl acetate copolymer, into the EVOH. However, those elastomers have disadvantages of: having low compatibility with the EVOH, resulting in a composition with low transparency; and reducing the gas barrier properties of the EVOH itself.

In view of the foregoing, as a method of improving transparency while securing the above-mentioned processing suitability, a method involving blending EVOH's having different ethylene contents has been considered. In JP 08-239528 A (Patent Literature 4), there is a disclosure of a resin composition containing two kinds of ethylene-vinyl acetate copolymer saponified products having saponification degrees of 95 mol % or more and 70 mol % or more and polyamide having its terminal carboxy group adjusted. In JP 2000-212369 A (Patent Literature 5), there is a disclosure of a resin composition containing an EVOH having a saponification degree of 98 mol % or more and an EVOH having its saponification degree decreased by reacetylation. Those compositions are improved in transparency and heat stretchability, but have, for example, the following disadvantages owing to the use of the polyamide or the reacetylated EVOH: a long-run property is low, and hence occurrence of gelled matter at the time of a long run is increased; and from an environmental point of view, consideration is required of an odor of a decomposition product, such as acetic acid, at the time of molding. In addition, two or more kinds of EVOH's to be blended are themselves each a hard and brittle resin, and blending thereof does not change the properties thereof.

In addition, a crack or the like occurring in the barrier layer in a food container causes, for example, a food in that portion to spoil or discolor in a period of time before an expiration date, and hence is a critical defect for the food container. Therefore, an EVOH having a relatively high ethylene content is sometimes used. In this case, the gas barrier properties are reduced, and hence the thickness needs to be increased accordingly, leading to an increase in cost.

As described above, there has heretofore been no satisfactory method of ameliorating the drawbacks of the vinyl alcohol-based resin of being poor in flexibility, and being hard and brittle, without impairing excellent properties of the vinyl alcohol-based resin, such as high gas barrier properties.

A polyamide (also called nylon)-based resin is excellent in various physical properties, such as strength, heat resistance, gas barrier properties, optical characteristics, or oil resistance, and is used in various fields, such as parts for automobiles/vehicles, parts for electrical/electronic use, and films for packaging. Further, in recent years, particularly in the automobile industry, the polyamide-based resin has been adopted for various parts to replace metal parts for the purpose of enhancing fuel efficiency through lightweighting of a vehicle.

In general, the polyamide-based resin is produced by subjecting a dicarboxylic acid and a diamine to condensation polymerization, and is a polymer having a repeating unit of an amide bond. Basic physical properties, such as heat resistance and strength, of the polyamide-based resin to be obtained can be controlled by changing chemical structures of the dicarboxylic acid and the diamine to be used as raw materials, and the structures are designed in accordance with physical properties required in intended use.

Polyamide MXD6 (also called nylon MXD6 or MXD6-nylon) is an aromatic polyamide-based resin obtained by subjecting adipic acid and m-xylylenediamine to condensation polymerization, and is excellent in gas barrier properties as compared to other polyamide-based resins. Therefore, polyamide MXD6 is used as a gas barrier layer for food packaging, a PET bottle, or the like.

However, polyamide MXD6 has drawbacks of being a hard and brittle resin, and being poor in flexibility. Accordingly, its processability for molding into, for example, a packaging material for a food or the like, in particular, its heat stretchability is low, and hence there are: a risk in that a crack may occur in the barrier layer at the time of the molding to reduce a yield of a product; and a risk in that a reduction in mechanical strength, reductions in gas barrier properties, or the like due to thickness unevenness may occur, causing a lack of quality stability. Further, there is also a problem in, for example, that when polyamide MXD6 is used as a packaging material or a molding material while being repeatedly bent, a crack or a pinhole easily occurs owing to bending fatigue or the like, with the result that its excellent performance cannot be kept.

In JP 07-15059 B2 (Patent Literature 6) and JP 09-183900 A (U.S. Pat. No. 5,780,577 A; Patent Literature 7), an acid-modified product of an ethylene-based copolymer or an acid-modified product of a partially saponified ethylene-vinyl acetate copolymer is added in order to enhance pinhole resistance. However, each of those copolymers has a carboxy group in the molecule, and when mixed into the polyamide-based resin, is liable to clog a filter arranged in a path for a molten resin in an extruder at the time of film molding. In addition, owing to filter exchange, a problem arises in that film productivity is immensely affected.

As described above, there has heretofore been no satisfactory method of ameliorating the drawbacks of the polyamide-based resin of being poor in flexibility, and being hard and brittle, without impairing excellent properties of the polyamide-based resin, such as high gas barrier properties.

Polyester-based resins typified by polyethylene terephthalate (abbreviation: PET), polybutylene terephthalate (abbreviation: PBT), polyethylene naphthalate (abbreviation: PEN), and the like are excellent in mechanical characteristics and chemical characteristics, and are used in various fields, such as parts for automobiles/vehicles, parts for electrical/electronic use, and films for packaging, depending on their respective characteristics. In addition, in particular, a bottle obtained by blow molding from a saturated polyester, such as polyethylene terephthalate, is excellent in mechanical strength, transparency, and gas barrier properties, and hence is used also as a container for juice, a carbonated drink, a soft drink, or the like, or a container for a cosmetic, eye drops, or the like.

In general, the polyester-based resin is produced by subjecting a dicarboxylic acid and a diol to condensation polymerization, and is a polymer having a repeating unit of an ester bond. Basic physical properties, such as heat resistance and strength, of the polyester-based resin to be obtained can be controlled by changing chemical structures of the dicarboxylic acid and the diol to be used as raw materials, and the structures are designed in accordance with physical properties required in intended use.

Polybutylene terephthalate is a saturated polyester produced by subjecting terephthalic acid and 1,4-butanediol to condensation polymerization, and is used for, for example, electrical/electronic parts, such as a hair dryer, a telephone, a connector, and a switch, and automobile parts, such as a door handle, an ignition coil, a side mirror, a valve, and a switch.

In addition, in film applications, for example, the following are produced: an unstretched polybutylene terephthalate film according to a cast molding method, mainly for food packaging; and a uniaxially stretched polybutylene terephthalate film for a shrink label of a drink bottle. However, owing to its high crystallinity, polybutylene terephthalate has drawbacks of being a hard and brittle resin, and being poor in flexibility. Accordingly, its processability for molding into, for example, a packaging material for a food or the like, in particular, its heat stretchability is low, and hence there are: a risk in that a crack may occur in the barrier layer at the time of the molding to reduce a yield of a product; and a risk in that a reduction in mechanical strength, reductions in gas barrier properties, or the like due to thickness unevenness may occur, causing a lack of quality stability. Further, there is also a problem in, for example, that when polybutylene terephthalate is used as a packaging material or a molding material while being repeatedly bent, a crack or a pinhole easily occurs owing to bending fatigue or the like, with the result that its excellent performance cannot be kept. In addition, biaxial stretch molding is used for a general-purpose plastic, such as polypropylene or polyamide 6, but in the case of polybutylene terephthalate, a biaxially stretched film has not yet been put into practical use owing to low heat stretchability due to a high crystallization rate.

In JP 2006-241398 A (Patent Literature 8) or JP 2016-191009 A (Patent Literature 9), there is a description of a method involving blending a polyester elastomer or polycarbonate, in order to enhance flexibility or heat stretchability. However, the method has a problem of impairment of original characteristics of polybutylene terephthalate, such as significant reductions in transparency and gas barrier properties.

As described above, there has heretofore been no satisfactory method of ameliorating the drawbacks of the polyester-based resin of being poor in flexibility, and being hard and brittle, without impairing excellent properties of the polyester-based resin, such as high gas barrier properties.

CITATION LIST

Patent Literature

[PTL 1] JP 53-088067 A
[PTL 2] JP 52-141785 A
[PTL 3] JP 59-20345 A
[PTL 4] JP 08-239528 A
[PTL 5] JP 2000-212369 A
[PTL 6] JP 07-15059 B2
[PTL 7] JP 09-183900 A (U.S. Pat. No. 5,780,577 A)
[PTL 8] JP 2006-241398 A
[PTL 9] JP 2016-191009 A

SUMMARY OF INVENTION

Technical Problem

An object of the present invention is to provide: a resin composition ameliorated in low flexibility and low impact resistance, which are drawbacks of a gas-barrier resin, without impairing excellent gas barrier properties of the gas-barrier resin; a film, sheet, or container molded using the resin composition; and the like.

Solution to Problem

The inventors of the present invention have made extensive investigations in order to achieve the above-mentioned object, and as a result, have found that, when an ethylene/hydroxy group-containing allyl monomer copolymer having high flexibility is blended into a gas-barrier resin, a resin composition having excellent flexibility and impact resistance imparted thereto without impairing excellent gas barrier properties derived from the gas-barrier resin and a molded article thereof are obtained. Thus, the inventors have completed the present invention.

That is, the present invention relates to the following items [1] to [19].

[1] A gas-barrier resin composition, including: a gas-barrier resin (A) having an oxygen permeability coefficient of $1.0 \times 10^{-14}$ ($cm^3 \cdot cm/cm^2 \cdot s \cdot Pa$) or less; and a copolymer (B) containing monomer structural units represented by the formula (1), the formula (2), and the formula (3):

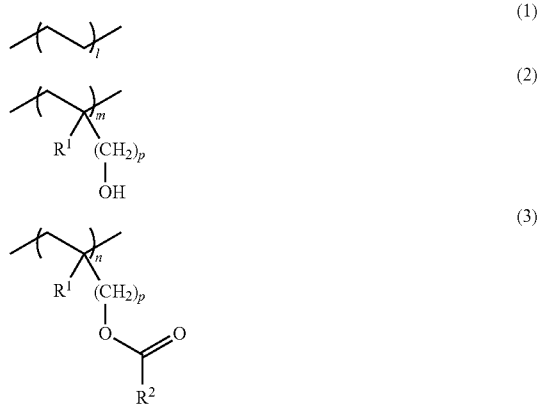

where: $R^1$ represents a hydrogen atom or a methyl group; $R^2$ represents a hydrocarbon group having 1 to 20 carbon atoms that may be substituted with a halogen atom, a hydroxy group, an alkoxy group, or an amino group; 1, m, and n represent numerical values representing molar proportions of the respective monomer structural units, and n may represent 0; and p represents an integer of from 1 to 4, wherein a ratio of a mass of the copolymer (B) to a total mass of the gas-barrier resin (A) and the copolymer (B) is from 1 mass % to 40 mass %.

[2] The gas-barrier resin composition according to the above-mentioned item 1, wherein the hydrocarbon group having 1 to 20 carbon atoms represented by $R^2$ is an alkyl group having 1 to 20 carbon atoms or an aryl group having 6 to 20 carbon atoms.

[3] The gas-barrier resin composition according to the above-mentioned item 1 or 2, wherein, in the copolymer (B), the molar proportion 1 of the monomer structural unit represented by the formula (1), the molar proportion m of the monomer structural unit represented by the formula (2), and the molar proportion n of the monomer structural unit represented by the formula (3) satisfy the following expression: $80 \geq \{(m+n)/(l+m+n)\} \times 100 \geq 0.1$.

[4] The gas-barrier resin composition according to any one of the above-mentioned items 1 to 3, wherein, in the copolymer (B), the molar proportion m of the monomer structural unit represented by the formula (2) and the molar proportion n of the monomer structural unit represented by the formula (3) satisfy the following expression: $100\{m/(m+n)\} \times 100 \geq 50$.

[5] The gas-barrier resin composition according to any one of the above-mentioned items 1 to 3, wherein, in the monomer structural unit represented by the formula (3) in the copolymer (B), n=0.

[6] The gas-barrier resin composition according to any one of the above-mentioned items 1 to 5, wherein the copolymer (B) has a number-average molecular weight (Mn) of from 1,000 to 1,000,000, and a ratio Mw/Mn between a weight-average molecular weight (Mw) and the number-average molecular weight (Mn) of from 1.5 to 4.0.

[7] The gas-barrier resin composition according to any one of the above-mentioned items 1 to 6, wherein, in the formula (2) and the formula (3), $R^1$ represents a hydrogen atom and p represents 1.

[8] The gas-barrier resin composition according to any one of the above-mentioned items 1 to 7, wherein the gas-barrier resin (A) is a vinyl alcohol-based resin (A1).

[9] The gas-barrier resin composition according to the above-mentioned item 8, wherein the vinyl alcohol-based resin (A1) is an ethylene-vinyl alcohol-based copolymer containing 10 mol % to 60 mol % of an ethylene structural unit.

[10] The gas-barrier resin composition according to any one of the above-mentioned items 1 to 7, wherein the gas-barrier resin (A) is a polyamide-based resin (A2).

[11] The gas-barrier resin composition according to the above-mentioned item 10, wherein the polyamide-based resin (A2) is at least one kind selected from polyamide 6, polyamide 66, and polyamide MXD6.

[12] The gas-barrier resin composition according to any one of the above-mentioned items 1 to 7, wherein the gas-barrier resin (A) is a polyester-based resin (A3).

[13] The gas-barrier resin composition according to the above-mentioned item 12, wherein the polyester-based resin (A3) is at least one kind selected from polyethylene terephthalate and polybutylene terephthalate.

[14] A container, including, as a barrier layer, the gas-barrier resin composition of any one of the above-mentioned items 1 to 13.

[15] A resin molded article, which is obtained by molding the gas-barrier resin composition of any one of the above-mentioned items 1 to 13.

[16] The resin molded article according to the above-mentioned item 15, wherein the molding is an injection molding method or an extrusion molding method.

[17] The resin molded article according to the above-mentioned item 15 or 16, wherein the resin molded article is any one of a sheet, a film, a tube, a pipe, a bottle, or a tank.

[18] A modifier for a gas-barrier resin having an oxygen permeability coefficient of $1.0 \times 10^{-14}$ ($cm^3 \cdot cm/cm^2 \cdot s \cdot Pa$) or less, the modifier including, as a component, a copolymer containing monomer structural units represented by the formula (1), the formula (2), and the formula (3):

-continued

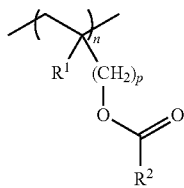
(3)

where: $R^1$ represents a hydrogen atom or a methyl group; $R^2$ represents a hydrocarbon group having 1 to 20 carbon atoms that may be substituted with a halogen atom, a hydroxy group, an alkoxy group, or an amino group; l, m, and n represent numerical values representing molar proportions of the respective monomer structural units, and n may represent 0; and p represents an integer of from 1 to 4.

[19] A method of modifying a gas-barrier resin, including mixing a copolymer containing monomer structural units represented by the formula (1), the formula (2), and the formula (3):

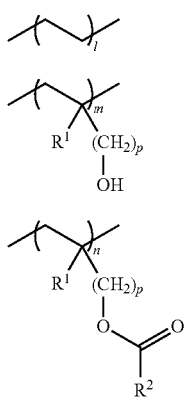

(1)

(2)

(3)

where: $R^1$ represents a hydrogen atom or a methyl group; $R^2$ represents a hydrocarbon group having 1 to 20 carbon atoms that may be substituted with a halogen atom, a hydroxy group, an alkoxy group, or an amino group; l, m, and n represent numerical values representing molar proportions of the respective monomer structural units, and n may represent 0; and p represents an integer of from 1 to 4, into a gas-barrier resin (A) having an oxygen permeability coefficient of $1.0 \times 10^{-14}$ (cm$^3$·cm/cm$^2$·s·Pa) or less.

Advantageous Effects of Invention

The gas-barrier resin composition of the present invention, which has the ethylene/hydroxy group-containing allyl monomer copolymer having high flexibility blended into the gas-barrier resin, is improved in flexibility and impact resistance without impairing excellent gas barrier properties derived from the gas-barrier resin, and hence is useful as, for example, a barrier layer of each of a sheet, a film, and a container, such as a bag, a bottle, or a tank.

DESCRIPTION OF EMBODIMENTS

A gas-barrier resin composition of the present invention includes: a gas-barrier resin (A) having an oxygen permeability coefficient of $1.0 \times 10^{-14}$ (cm$^3$·cm/cm$^2$·s·Pa) or less;

and a copolymer (B) containing monomer structural units represented by the formula (1), the formula (2), and the formula (3):

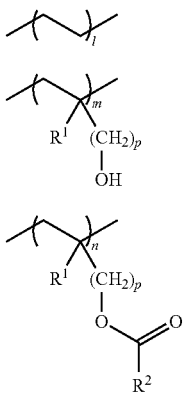

(1)

(2)

(3)

wherein a ratio of a mass of the copolymer (B) to a total mass of the gas-barrier resin (A) and the copolymer (B) is from 1 mass % to 40 mass %.

In the formulae (1) to (3): $R^1$ represents a hydrogen atom or a methyl group; $R^2$ represents a hydrocarbon group having 1 to 20 carbon atoms that may be substituted with a halogen atom, a hydroxy group, an alkoxy group, or an amino group; l, m, and n represent numerical values representing molar proportions of the respective monomer structural units, and n may represent 0; and p represents an integer of from 1 to 4.

[Gas-Barrier Resin (A)]

The gas-barrier resin (A) serving as a component of the gas-barrier resin composition of the present invention is a resin whose oxygen permeability coefficient is $1.0 \times 10^{-14}$ (cm$^3$·cm/cm$^2$·s·Pa) or less. The oxygen permeability coefficient is a value measured by a differential pressure method in conformity with JIS K7126. An oxygen gas permeation amount (cm$^3$) is a value at standard temperature and pressure (STP; 0° C. and 1 atm). A specific measurement method is described in the "Examples" section.

Examples of such gas-barrier resin (A) include amorphous polyethylene terephthalate, polyvinyl chloride, nylon-6, polyvinyl fluoride, polyvinylidene chloride, polyacrylonitrile, an ethylene-vinyl alcohol copolymer, and polyvinyl alcohol. In Table 1, the oxygen permeability coefficients of major resins are shown (source: Polymer handbook 4th Edition, John Wiley & Sons, Inc. (1999) and the like).

TABLE 1

| Kind of resin | Oxygen permeability coefficient (cm$^3$ · cm/cm$^2$ · s · Pa) |
|---|---|
| Silicone rubber | $3.7 \times 10^{-11}$ |
| Natural rubber | $1.8 \times 10^{-12}$ |
| Low-density polyethylene | $2.2 \times 10^{-13}$ |
| Polystyrene | $1.9 \times 10^{-13}$ |
| Polypropylene | $1.7 \times 10^{-13}$ |
| Polycarbonate | $1.0 \times 10^{-13}$ |
| Polyvinyl acetate | $3.7 \times 10^{-14}$ |
| Amorphous polyethylene terephthalate | $4.4 \times 10^{-15}$ |
| Polyvinyl chloride | $3.4 \times 10^{-15}$ |
| Nylon-6 | $2.9 \times 10^{-15}$ |
| Polyvinyl fluoride | $1.4 \times 10^{-15}$ |
| Polyvinylidene chloride | $3.8 \times 10^{-16}$ |
| Polyacrylonitrile | $1.5 \times 10^{-17}$ |

TABLE 1-continued

| Kind of resin | Oxygen permeability coefficient ($cm^3 \cdot cm/cm^2 \cdot s \cdot Pa$) |
|---|---|
| Ethylene-vinyl alcohol copolymer | $6.8 \times 10^{-18}$ |
| Polyvinyl alcohol | $5.0 \times 10^{-18}$ |

In the present invention, the gas-barrier resin (A) may be a combination of a plurality of kinds of resins each having an oxygen permeability coefficient of $1.0 \times 10^{-14}$ ($cm^3 \cdot cm/cm^2 \cdot s \cdot Pa$) or less. In addition, the composition may contain another gas-barrier resin as long as the effect of the present invention is not impaired.

From the viewpoint of having good compatibility with the copolymer (B) of the present invention, a vinyl alcohol-based resin (A1), such as an ethylene-vinyl alcohol copolymer, a polyamide-based resin (A2), such as nylon-6, or a polyester-based resin (A3), such as polybutylene terephthalate, is particularly preferred.

[Vinyl Alcohol-Based Resin (A1)]

The vinyl alcohol-based resin (A1) serving as a component of the gas-barrier resin composition of the present invention is a polymer containing a structural unit derived from a vinyl alcohol-based monomer. The vinyl alcohol-based monomer is a monomer containing a carbon-carbon double bond and a hydroxy group (provided that a monomer that gives a structure represented by the formula (2) is excluded), and examples thereof include vinyl alcohol, 1-buten-3-ol, 2-methyl-2-propen-1-ol, and 1-butene-3,4-diol. The vinyl alcohol-based resin (A1) is preferably a polymer containing a vinyl alcohol structural unit, and may be obtained by copolymerizing vinyl alcohol and ethylene, 1-butene-3,4-diol, or the like. Specific examples thereof include polyvinyl alcohol (PVOH) and an ethylene-vinyl alcohol copolymer (EVOH) obtained by copolymerizing vinyl alcohol and ethylene. When the vinyl alcohol-based resin (A1) is the ethylene-vinyl alcohol copolymer, its ethylene content is preferably from 10 mol % to 60 mol %, and is more preferably from 20 mol % to 50 mol % from the viewpoints of gas barrier properties and polymer physical properties under high humidity. When the ethylene content is less than 10 mol %, heat resistance and extrusion moldability are reduced. When the ethylene content is more than 60 mol %, gas barrier properties are remarkably reduced.

The vinyl alcohol-based resin (A1) is produced by subjecting a vinyl ester (co)polymer to a hydrolysis reaction under an acidic condition or a saponification reaction under a basic condition. For example, the EVOH is obtained by a hydrolysis or saponification reaction using an ethylene-vinyl ester copolymer typified by an ethylene-vinyl acetate copolymer as a raw material. The ratio of the number of vinyl alcohol structural units to the sum of the number of vinyl alcohol structural units and the number of vinyl ester structural units in the vinyl alcohol-based resin (A1) (rate of hydrolysis or rate of saponification) is preferably 85 mol % or more, more preferably 90 mol % or more, still more preferably 98 mol % or more, from the viewpoints of thermal stability and gas barrier properties.

A (co)polymerization method for a vinyl ester compound for obtaining the vinyl ester (co)polymer is not particularly limited, and (co)polymerization may be performed by a known method, such as a solution polymerization method, a suspension polymerization method, an emulsion polymerization method, or a bulk polymerization method. In addition, the mode of the polymerization may be a batch mode or a continuous mode, and the polymerization may be performed by single-stage polymerization or multi-stage polymerization.

In addition, the manner in which the vinyl ester compound is (co)polymerized is not particularly limited, and the (co)polymerization may be performed by, for example, a method such as: a radical polymerization method involving using an organic/inorganic peroxide, an azo-based compound, or the like as a catalyst; a cationic polymerization method involving using a Lewis acid, a Brønsted acid, or the like as a catalyst; an anionic polymerization method involving using a Lewis base or the like as a catalyst; or a coordinated anionic polymerization method involving using a metal complex catalyst or the like. From the viewpoint of the polymerization reactivity of the vinyl ester compound, the radical polymerization method is particularly preferred.

Examples of the vinyl ester compound to be used in the polymerization include vinyl acetate, vinyl propionate, vinyl trifluoroacetate, and vinyl benzoate. Of those, from the viewpoint of the ease of industrial availability, vinyl acetate is particularly preferred.

In addition, the vinyl alcohol-based resin (A1) may be a polymer obtained by causing part of vinyl alcohol structural units of PVOH or EVOH to be formalized with formaldehyde or butyralized with butyraldehyde, or a polymer obtained by graft-polymerizing another monomer onto PVOH or EVOH.

The vinyl alcohol-based resin (A1) may contain any other structural unit derived from a monomer other than ethylene and a vinyl ester. As a monomer that gives such other structural unit, there are given, for example, a (meth)acrylic acid ester-based compound, a (meth)acrylic acid compound, a vinyl ether-based compound, a vinylsilane-based compound, and a vinylsiloxane-based compound.

[Polyamide-based Resin (A2)] The polyamide-based resin (A2) serving as a component of the gas-barrier resin composition of the present invention is a polymer having a repeating unit of an amide bond formed by condensation of a carboxy group and an amino group, and is also called nylon. Examples of the polyamide-based resin (A2) include polyamide 6 (also called 6-nylon or nylon 6) obtained by ring-opening polymerization of ε-caprolactam, polyamide 66 (also called 6,6-nylon or nylon 6,6) obtained by condensation polymerization of adipic acid and hexamethylenediamine, polyamide MXD6 (also called MXD6-nylon or nylon MXD6) obtained by condensation polymerization of adipic acid and m-xylylenediamine, polyamide MXD10 (also called MXD10-nylon or nylon MXD10) obtained by condensation polymerization of sebacic acid and m-xylylenediamine, polyamide 610 (also called 6,10-nylon or nylon 6,10) obtained by condensation polymerization of sebacic acid and hexamethylenediamine, polyamide 612 (also called 6,12-nylon or nylon 6,12) obtained by condensation polymerization of dodecanedioic acid and hexamethylenediamine, polyamide 11 (also called 11-nylon or nylon 11) obtained by condensation polymerization of ω-aminoundecanoic acid, polyamide 12 (also called 12-nylon or nylon 12) obtained by ring-opening polymerization of laurolactam, and polyamide 46 (also called 4,6-nylon or nylon 4,6) obtained by condensation polymerization of adipic acid and 1,4-diaminobutane. The polyamide-based resin (A) may contain a plurality of kinds of those polymers. Of those, polyamide 6, polyamide 66, and polyamide MXD6 are preferred as the polyamide-based resin from the viewpoints of a general-purpose property and gas-barrier properties.

Production methods for the polyamide-based resin (A2) are broadly classified into the following two methods: a method involving subjecting a dicarboxylic acid and a diamine to condensation polymerization; and a method involving subjecting a cyclic lactam to ring-opening polymerization. The polymerization may be performed by a known method, such as a melt polymerization method, a solid-phase polymerization method, a solution polymerization method, or a bulk polymerization method. In addition, the mode of the polymerization may be a batch mode or a continuous mode, and the polymerization may be performed by single-stage polymerization or multi-stage polymerization.

[Polyester-Based Resin (A3)]

The polyester-based resin (A3) serving as a component of the gas-barrier resin composition of the present invention is a polymer having a repeating unit of an ester bond (—C(=O)—O—) formed by condensation of a carboxy group and a hydroxy group.

A general production method for the polyester-based resin (A3) is a method involving subjecting a dicarboxylic acid or a diester and a diol to condensation polymerization under an acidic condition or a basic condition. The polymerization may be performed by a known method, such as a melt polymerization method, a solid-phase polymerization method, a solution polymerization method, or a bulk polymerization method. In addition, the mode of the polymerization may be a batch mode or a continuous mode, and the polymerization may be performed by single-stage polymerization or multi-stage polymerization.

Specific examples of the dicarboxylic acid to be used in the production of the polyester-based resin (A3) include phthalic acid, isophthalic acid, terephthalic acid, 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,4-naphthalenedicarboxylic acid, 2,6-naphthalenedicarboxylic acid, 2,7-naphthalenedicarboxylic acid, 4,4'-biphenyldicarboxylic acid, cis-1,2-cyclopropanedicarboxylic acid, trans-1,2-cyclopropanedicarboxylic acid, cis-1,2-cyclobutanedicarboxylic acid, trans-1,2-cyclobutanedicarboxylic acid, cis-1,3-cyclobutanedicarboxylic acid, trans-1,3-cyclobutanedicarboxylic acid, cis-1,2-cyclopentanedicarboxylic acid, trans-1,2-cyclopentanedicarboxylic acid, cis-1,3-cyclopentanedicarboxylic acid, trans-1,3-cyclopentanedicarboxylic acid, cis-1,2-cyclohexanedicarboxylic acid, trans-1,2-cyclohexanedicarboxylic acid, cis-1,3-cyclohexanedicarboxylic acid, trans-1,3-cyclohexanedicarboxylic acid, cis-1,4-cyclohexanedicarboxylic acid, trans-1,4-cyclohexanedicarboxylic acid, oxalic acid, malonic acid, succinic acid, glutaric acid, adipic acid, sebacic acid, and dodecanedioic acid.

The diester to be used in the production of the polyester-based resin (A3) is a compound obtained by a condensation reaction of the above-mentioned dicarboxylic acid and an alcohol. Specific examples of the alcohol include methanol, ethanol, n-propanol, isopropanol, n-butanol, isobutanol, s-butanol, t-butanol, and phenol. The dicarboxylic acids or the diesters may be used in combination thereof.

Specific examples of the diol to be used in the production of the polyester-based resin (A3) include ethylene glycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, cis-1,2-cyclohexanedimethanol, trans-1,2-cyclohexanedimethanol, cis-1,3-cyclohexanedimethanol, trans-1,3-cyclohexanedimethanol, cis-1,4-cyclohexanedimethanol, and trans-1,4-cyclohexanedimethanol. The diols may be used in combination thereof.

For the polyester-based resin (A3) serving as a component of the gas-barrier resin composition of the present invention, two or more kinds of resins may be used in combination.

From the viewpoints of a general-purpose property and strength, it is preferred that the polyester-based resin (A3) serving as a component of the gas-barrier resin composition of the present invention be: polyethylene terephthalate produced by condensation polymerization of terephthalic acid or an ester thereof and ethylene glycol; polytrimethylene terephthalate (abbreviation: PTT) produced by condensation polymerization of terephthalic acid or an ester thereof and 1,3-propanediol; polybutylene terephthalate produced by condensation polymerization of terephthalic acid or an ester thereof and 1,4-butanediol; polyethylene naphthalate produced by condensation polymerization of 2,6-naphthalenedicarboxylic acid or an ester thereof and ethylene glycol; or polybutylene naphthalate (abbreviation: PBN) produced by condensation polymerization of 2,6-naphthalenedicarboxylic acid or an ester thereof and 1,4-butanediol. Of those, polyethylene terephthalate and polybutylene terephthalate are particularly preferred from the viewpoints of a general-purpose property and gas barrier properties.

[Copolymer (B)]

The copolymer (B) contained in the gas-barrier resin composition of the present invention is blended in order to enhance the flexibility and impact resistance of the gas-barrier resin composition, and is a copolymer containing monomer structural units represented by the following formula (1), formula (2), and as required, formula (3).

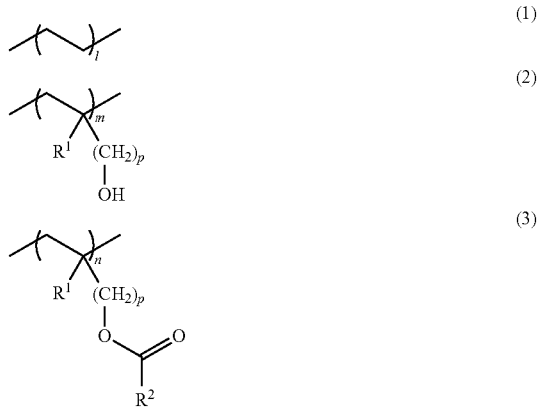

The copolymer (B) is described in detail below.

In the formula (2) and the formula (3), $R^1$ represents a hydrogen atom or a methyl group and p represents an integer of from 1 to 4. It is preferred that $R^1$ represent a hydrogen atom, and it is preferred that p represent 1.

In the formula (3), $R^2$ represents a hydrocarbon group having 1 to 20 carbon atoms that may be substituted with a halogen atom, a hydroxy group, an alkoxy group, or an amino group. The hydrocarbon group having 1 to 20 carbon atoms is preferably an alkyl group having 1 to 20 carbon atoms or an aryl group having 6 to 20 carbon atoms. The aryl group encompasses an aromatic ring having added thereto an alkyl group. The halogen atom serving as a substituent is preferably a fluorine, chlorine, or bromine atom, more preferably a fluorine atom. The alkoxy group serving as a substituent is preferably an alkoxy group having 1 to 3 carbon atoms.

Specific examples of the hydrocarbon group having 1 to 20 carbon atoms that may be substituted with a halogen atom, a hydroxy group, an alkoxy group, or an amino group represented by $R^2$ include a methyl group, an ethyl group, a n-propyl group, an isopropyl group, a n-butyl group, an isobutyl group, a sec-butyl group, a tert-butyl group, a n-pentyl group, a neopentyl group, a n-hexyl group, a trifluoromethyl group, a trichloromethyl group, a tribromomethyl group, a pentafluoroethyl group, a pentachloroethyl group, a pentabromoethyl group, a phenyl group, a 2-methylphenyl group, a 3-methylphenyl group, a 4-methylphenyl group, a 2,6-dimethylphenyl group, a 2,4,6-trimethylphenyl group, a 2-methoxyphenyl group, a 3-methoxyphenyl group, a 4-methoxyphenyl group, a 2,3-dimethoxyphenyl group, a 2,4-dimethoxyphenyl group, a 2,5-dimethoxyphenyl group, a 2,6-dimethoxyphenyl group, a 2,4,6-trimethoxyphenyl group, a 2-ethoxyphenyl group, a 3-ethoxyphenyl group, a 4-ethoxyphenyl group, a 2,3-diethoxyphenyl group, a 2,4-diethoxyphenyl group, a 2,5-diethoxyphenyl group, a 2,6-diethoxyphenyl group, a 2,4,6-triethoxyphenyl group, a 2-propoxyphenyl group, a 3-propoxyphenyl group, a 4-propoxyphenyl group, a 2,3-dipropoxyphenyl group, a 2,4-dipropoxyphenyl group, a 2,5-dipropoxyphenyl group, a 2,6-dipropoxyphenyl group, a 2,4,6-tripropoxyphenyl group, a 2-isopropoxyphenyl group, a 3-isopropoxyphenyl group, a 4-isopropoxyphenyl group, a 2,3-diisopropoxyphenyl group, a 2,4-diisopropoxyphenyl group, a 2,5-diisopropoxyphenyl group, a 2,6-diisopropoxyphenyl group, a 2,4,6-triisopropoxyphenyl group, a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 2,4,6-trihydroxyphenyl group, a hydroxymethyl group, a 2-hydroxyethyl group, a 2-hydroxy-n-propyl group, a 3-hydroxy-n-propyl group, a pentafluorophenyl group, a 2-trifluoromethylphenyl group, a 3-trifluoromethylphenyl group, a 4-trifluoromethylphenyl group, a 3,5-di(trifluoromethyl)phenyl group, a 2,3-di(trifluoromethyl)phenyl group, a 2,4-di(trifluoromethyl)phenyl group, a 3,4-di(trifluoromethyl)phenyl group, and 2,4,6-tris(trifluoromethyl) phenyl group. Of those, a methyl group, an ethyl group, a phenyl group, a trifluoromethyl group, and a trichloromethyl group are preferred, and a methyl group and a trifluoromethyl group are more preferred, from the viewpoints of the cost and industrial availability of the monomer serving as a raw material.

Symbols l, m, and n represent the molar proportions of the monomer structural unit represented by the formula (1), the monomer structural unit represented by the formula (2), and the monomer structural unit represented by the formula (3), respectively, and n may represent 0.

The molar ratio of the sum of the number of monomer structural units each represented by the formula (2) and the number of monomer structural units each represented by the formula (3) to the total number of monomer structural units:

$\{(m+n)/(l+m+n)\} \times 100$ is preferably from 0.1 mol % to 80 mol %, more preferably from 5 mol % to 50 mol %, still more preferably from 10 mol % to 40 mol %, from the viewpoints of the ease of mixing with the gas-barrier resin (A) and the physical properties of the gas-barrier resin composition.

The molar ratio of the number of monomer structural units each represented by the formula (2) to the sum of the number of monomer structural units each represented by the formula (2) and the number of monomer structural units each represented by the formula (3):

$\{m/(m+n)\} \times 100$ is preferably 50 mol % or more, more preferably 70 mol % or more, still more preferably 90 mol % or more, from the viewpoints of the ease of mixing with the gas-barrier resin (A) and the physical properties of the gas-barrier resin composition.

The copolymer (B) is used for imparting flexibility and impact resistance to the gas-barrier resin (A), and the copolymer (B) itself preferably has flexibility and impact resistance.

The molecular weight and molecular weight distribution of the copolymer (B) are not particularly limited. From the viewpoint of the ease of mixing with the gas-barrier resin (A), the copolymer (B) has a number-average molecular weight (Mn) of preferably from 1,000 to 1,000,000, more preferably from 2,000 to 300,000, still more preferably from 3,000 to 100,000. From a similar viewpoint, the copolymer (B) has a ratio (Mw/Mn) between the number-average molecular weight (Mn) and a weight-average molecular weight (Mw), which serves as an indicator for molecular weight distribution, of preferably from 1.5 to 4.0, more preferably from 1.5 to 3.0.

The copolymer (B) may contain a structural unit other than the monomer structural units represented by the formula (1), the formula (2), and the formula (3). As a monomer that gives such other structural unit, there are given, for example, a (meth)acrylic acid ester-based compound, a (meth)acrylic acid compound, a vinyl ether-based compound, a vinylsilane-based compound, and a vinyl siloxane-based compound. Such other structural unit preferably accounts for 5 mol % or less in the copolymer (B) from the viewpoint of gas barrier properties.

A production method for the copolymer (B) is not particularly limited. For example, the copolymer (B) may be obtained by a method involving copolymerizing ethylene, a hydroxy group-containing monomer represented by the formula (4):

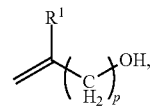

(4)

and a monomer having an ester group represented by the formula (5):

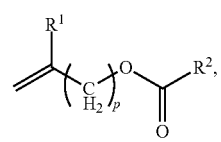

(5)

or a method involving copolymerizing ethylene and the monomer having an ester group represented by the formula (5) and then subjecting the copolymer to a hydrolysis or saponification reaction.

In the formula (4) and the formula (5), $R^1$, $R^2$, and p represent the same meanings as described above.

Examples of the hydroxy group-containing monomer represented by the formula (4) include allyl alcohol, 3-buten-1-ol, 4-penten-1-ol, 5-hexen-1-ol, methallyl alcohol, 3-methyl-3-buten-1-ol, 4-methyl-4-penten-1-ol, and 5-methyl-5-hexen-1-ol. Of those, allyl alcohol or methallyl alcohol is preferred, and allyl alcohol is more preferred.

Specific examples of the monomer having an ester group represented by the formula (5) include allyl acetate, 3-butenyl acetate, 4-pentenyl acetate, 5-hexenyl acetate, methallyl acetate, (3-methyl-3-butenyl) acetate, (4-methyl-4-pentenyl) acetate, (5-methyl-5-hexenyl) acetate, allyl propionate, 3-butenyl propionate, 4-pentenyl propionate, 5-hexenyl propionate, methallyl propionate, (3-methyl-3-butenyl) propionate, (4-methyl-4-pentenyl) propionate, (5-methyl-5-hexenyl) propionate, allyl butyrate, 3-butenyl butyrate, 4-pentenyl butyrate, 5-hexenyl butyrate, methallyl butyrate, (3-methyl-3-butenyl) butyrate, (4-methyl-4-pentenyl) butyrate, (5-methyl-5-hexenyl) butyrate, allyl valerate, 3-butenyl valerate, 4-pentenyl valerate, 5-hexenyl valerate, methallyl valerate, (3-methyl-3-butenyl) valerate, (4-methyl-4-pentenyl) valerate, (5-methyl-5-hexenyl) valerate, allyl benzoate, 3-butenyl benzoate, 4-pentenyl benzoate, 5-hexenyl benzoate, methallyl benzoate, (3-methyl-3-butenyl) benzoate, (4-methyl-4-pentenyl) benzoate, (5-methyl-5-hexenyl) benzoate, allyl trifluoroacetate, 3-butenyl trifluoroacetate, 4-pentenyl trifluoroacetate, 5-hexenyl trifluoroacetate, methallyl trifluoroacetate, (3-methyl-3-butenyl) trifluoroacetate, (4-methyl-4-pentenyl) trifluoroacetate, (5-methyl-5-hexenyl) trifluoroacetate, allyl trichloroacetate, 3-butenyl trichloroacetate, 4-pentenyl trichloroacetate, 5-hexenyl trichloroacetate, methallyl trichloroacetate, (3-methyl-3-butenyl) trichloroacetate, (4-methyl-4-pentenyl) trichloroacetate, (5-methyl-5-hexenyl) trichloroacetate, allyl tribromoacetate, 3-butenyl tribromoacetate, 4-pentenyl tribromoacetate, 5-hexenyl tribromoacetate, methallyl tribromoacetate, (3-methyl-3-butenyl) tribromoacetate, (4-methyl-4-pentenyl) tribromoacetate, and (5-methyl-5-hexenyl) tribromoacetate. Of those, allyl acetate, methallyl acetate, allyl trifluoroacetate, methallyl trifluoroacetate, allyl benzoate, and methallyl benzoate are preferred, and allyl acetate and methallyl acetate are more preferred, from the viewpoints of industrial availability and polymer productivity.

A polymerization method for ethylene and the monomers represented by the formula (4) and the formula (5) is not particularly limited, and the polymerization may be performed by, for example, a known method, such as a solution polymerization method, a suspension polymerization method, an emulsion polymerization method, a bulk polymerization method, or a vapor-phase polymerization method. In addition, the mode of the polymerization may be a batch mode or a continuous mode, and the polymerization may be performed by single-stage polymerization or multi-stage polymerization.

In addition, the manner in which ethylene and the monomers represented by the formula (4) and the formula (5) are polymerized is not particularly limited, and the polymerization may be performed by, for example, a method such as: a radical polymerization method involving using an organic/inorganic peroxide, an azo-based compound, or the like as a catalyst; a cationic polymerization method involving using a Lewis acid, a Brønsted acid, or the like as a catalyst; an anionic polymerization method involving using a Lewis base or the like as a catalyst; or a coordinated anionic polymerization method involving using a metal complex catalyst or the like. From the viewpoint of the polymerization reactivity of the monomers represented by the formula (4) and the formula (5), the cationic polymerization method, the anionic polymerization method, or the coordinated anionic polymerization method is preferred, and the coordinated anionic polymerization method is particularly preferred.

When the copolymer (B) is produced by adopting the coordinated anionic polymerization method for the manner in which ethylene and the monomers represented by the formula (4) and the formula (5) are polymerized, the polymerization catalyst to be used is not particularly limited, but from the standpoints of polymerization activity and the characteristics of the polymer to be obtained, a metal complex catalyst described in JP 2014-159540 A, JP WO2013/168626 A1, or the like is particularly preferred. Main features of the copolymer (B) obtained by polymerization using the above-mentioned metal complex catalyst as compared to a polymer obtained by the radical polymerization method utilized in general polymer production are as follows:

1) Being capable of providing a high-molecular-weight body, and having a narrow molecular weight distribution (Mw/Mn); and
2) Having a main chain structure that is substantially linear.

The monomer represented by the formula (4) or (5) has a methylene group at the α-position of a vinyl group or a vinylidene group. In the radical polymerization method, the polymerization reaction is terminated owing to degenerative chain transfer of a growing radical through the abstraction of a hydrogen radical from the methylene group, resulting in a low molecular weight. When the molecular weight of the copolymer (B) is low, the melt viscosity of the copolymer (B) becomes low, and hence uniform kneading is difficult at the time of hot-melt kneading with the gas-barrier resin (A). In addition, in general, the polymer obtained by the radical polymerization method is known to have a broad molecular weight distribution, and its ratio Mw/Mn is 4.0 or more.

It is known that, in radical polymerization, a backbiting reaction generates a radical in the middle of a polymer main chain, which serves as an origin from which a growth reaction proceeds, and hence the polymer to be produced has many long-chain branched structures and short-chain branches. As the number of branched structures increases, the number of methine carbon atoms having relatively high reactivity increases, and hence resin deterioration, such as oxidative deterioration, becomes more liable to occur.

Therefore, from the standpoints of high-temperature stability and weather resistance, it may be said that the copolymer (B) obtained by polymerization using the above-mentioned metal complex catalyst is more excellent than that obtained by radical polymerization.

With regard to the blending ratio of the copolymer (B) serving as a component of the gas-barrier resin composition of the present invention, the ratio of the mass of the copolymer (B) to the total mass of the gas-barrier resin (A) and the copolymer (B) is from 1 mass % to 40 mass %, preferably from 10 mass % to 35 mass %, more preferably from 15 mass % to 30 mass %. When the blending ratio of the copolymer (B) is less than 1 mass %, the resin composition to be obtained is inferior in flexibility and impact resistance. Meanwhile, when the blending ratio of the copolymer (B) is more than 40 mass %, the resin composition to be obtained is inferior in mechanical strength.

A plurality of compounds other than the gas-barrier resin (A) and the copolymer (B) may be present as components of the gas-barrier resin composition of the present invention.

Specific examples thereof include another polymer, an antioxidant, a light stabilizer, a metal deactivator, a plasticizer, a flame retardant, an antiseptic agent, an antistatic agent, a lubricant, a release agent, an inorganic filler, glass fibers, a foaming agent, and a colorant.

The gas-barrier resin composition of the present invention may be produced by kneading the gas-barrier resin (A) and the copolymer (B) by a conventional hot-melt kneading method. Specific examples of the hot-melt kneading method include hot-melt kneading methods each using a single-screw or twin-screw extruder, a kneader, a mill, a Brabender, or the like. Of those, a hot-melt kneading method using a twin-screw extruder excellent in kneading capability is preferred. In addition, a kneading temperature in this case is not particularly limited, and is selected in accordance with the melting temperatures and melt viscosities of the gas-barrier resin (A) and copolymer (B) to be kneaded.

When the gas-barrier resin (A) is the vinyl alcohol-based resin (A1), the kneading temperature may be arbitrarily selected from the range of from 150° C. to 350° C., preferably from 160° C. to 300° C., more preferably from 180° C. to 280° C.

When the gas-barrier resin (A) is the polyamide-based resin (A2), the kneading temperature may be arbitrarily selected from the range of from 150° C. to 350° C., preferably from 160° C. to 320° C., more preferably from 180° C. to 300° C.

When the gas-barrier resin (A) is the polyester-based resin (A3), the kneading temperature may be arbitrarily selected from the range of from 150° C. to 350° C., preferably from 160° C. to 300° C., more preferably from 180° C. to 280° C.

When the gas-barrier resin composition of the present invention contains the polyamide-based resin (A2) or the polyester-based resin (A3), the kneading may cause the polyamide-based resin (A2) or the polyester-based resin (A3) to react with part or all of the copolymer (B).

The gas-barrier resin composition of the present invention is formed into various resin molded articles, such as a film, a sheet, a container, a pipe, and fibers, by melt molding and the like. Herein, the film generally refers to a resin molded article having a thickness of 300 μm or less, and the sheet generally refers to a resin molded article having a thickness of more than 300 μm. Examples of the container include a bag, a tank, and a bottle.

A method for the melt molding is not particularly limited, but examples thereof include extrusion molding, cast molding, inflation extrusion molding, compression molding, blow molding, melt spinning, injection molding, injection blow molding, and stretch molding (e.g., stretch blow molding or stretch film molding). A melt molding temperature varies depending on, for example, the melting temperatures of the gas-barrier resin (A) and the copolymer (B). In the case of the vinyl alcohol-based resin (A1), the melt molding temperature is preferably from 160° C. to 300° C., more preferably from 180° C. to 280° C. In the case of the polyamide-based resin (A2), the melt molding temperature is preferably from 160° C. to 320° C., more preferably from 180° C. to 300° C. In the case of the polyester-based resin (A3), the melt molding temperature is preferably from 160° C. to 300° C., more preferably from 180° C. to 280° C.

The resin molded article may be pulverized and molded again for the purpose of reutilization. The resin molded article obtained by the melt molding may be subjected to secondary processing shaping, such as bending processing or thermoforming (vacuum forming, hot-plate pressure forming, or vacuum pressure forming), as required, to provide a resin molded article of interest.

The resin molded article may be a resin molded article of a single-layer structure formed only of a barrier layer formed from the gas-barrier resin composition (hereinafter referred to merely as "barrier layer"), but from the viewpoint of enhancing functionality, may be a molded body of a laminated structure having a layer formed of another component on at least one surface of the barrier layer (hereinafter referred to simply as "laminate"). Examples of the laminate include a multilayer film, a multilayer sheet, a multilayer container, a multilayer pipe, a multilayer hose, and multi-layer fibers.

The layer formed of another component of the laminate is preferably a thermoplastic resin layer formed from a thermoplastic resin. By virtue of having both the barrier layer and the thermoplastic resin layer, the laminate is excellent in external appearance quality, retort resistance, and processing characteristics.

The layer structure of the laminate is not particularly limited, but examples thereof include layer structures such as T/E/T, E/Ad/T, and T/Ad/E/Ad/T, where E represents a layer formed of the above-mentioned barrier layer, Ad represents a layer obtained from an adhesive resin, and T represents a layer obtained from a thermoplastic resin.

A method of producing the laminate is not particularly limited, but examples thereof include: a method involving melt-extruding a thermoplastic resin onto a resin molded article (e.g., a film or a sheet) obtained from the gas-barrier resin composition; a method involving coextruding the resin composition and another thermoplastic resin; a method involving coinjecting the resin composition and a thermoplastic resin; a method involving subjecting the resin composition and a thermoplastic resin to co-blow molding; a method involving subjecting the resin composition and a thermoplastic resin to co-inflation molding; and a method involving laminating the barrier layer or laminate obtained from the resin composition and a film, sheet, or the like of another base material through the use of a known adhesive, such as an isocyanate compound, an organotitanium compound, or a polyester-based compound.

Examples of the thermoplastic resin to be used in the layer formed of another component in the laminate include a homopolymer or copolymer of an olefin, such as linear low-density polyethylene, low-density polyethylene, high-density polyethylene, an ethylene-vinyl acetate copolymer, an ethylene-propylene copolymer, polypropylene, polybutene, or polypentene, polyester, such as polyethylene terephthalate or polybutylene terephthalate, a polyester elastomer, polyamide, such as polyamide 6 or polyamide 66, polystyrene, polyvinyl chloride, polyvinylidene chloride, an acrylic resin, a polyurethane elastomer, polycarbonate, chlorinated polyethylene, and chlorinated polypropylene. Of those, polypropylene, polyethylene, an ethylene-propylene copolymer, an ethylene-vinyl acetate copolymer, polyamide, polystyrene, and polyester are preferably used. Herein, the polyamide or the polyester may be the same kind as the polyamide-based resin (A2) or the polyester-based resin (A3) of the present invention.

The adhesive resin for forming the Ad layer is not particularly limited, but is preferably an adhesive resin containing a carboxylic acid-modified polyolefin. As the carboxylic acid-modified polyolefin, a modified olefin-based polymer containing a carboxyl group obtained by bonding an ethylenically unsaturated carboxylic acid, an ester thereof, or an anhydride thereof to an olefin-based polymer chemically (e.g., an addition reaction or a grafting reaction) may be suitably used. Herein, the olefin-based polymer means a polyolefin, such as polyethylene (low pressure or high pressure), linear low-density polyethylene, polypropylene, or polybutene, or a copolymer of an olefin and another monomer (such as a vinyl ester or an unsaturated carboxylic acid ester) (e.g., an ethylene-vinyl acetate copolymer or an ethylene-acrylic acid ester copolymer). Of those, linear low-density polyethylene, an ethylene-vinyl acetate copolymer, and an ethylene-acrylic acid ester copolymer are preferred, and linear low-density polyethylene and an ethylene-vinyl acetate copolymer are particularly preferred. Examples of the ethylenically unsaturated carboxylic acid, the ester thereof, or the anhydride thereof include an ethylenically unsaturated monocarboxylic acid or an ester thereof, and an ethylenically unsaturated dicarboxylic acid, or a mono or diester thereof, or an anhydride thereof. Of those, an ethylenically unsaturated dicarboxylic anhydride is preferred. Specific examples thereof include maleic acid, fumaric acid, itaconic acid, maleic anhydride, itaconic anhydride, maleic acid monomethyl ester, maleic acid monoethyl ester, maleic acid diethyl ester, and fumaric acid monomethyl ester. In particular, maleic anhydride is suitable. In addition, when the gas-barrier resin composition and the thermoplastic resin have adhesive properties, the adhesive resin does not need to be used.

In addition, when a polyamide-based resin composition containing the polyamide-based resin (A2), such as polyamide 6, is used, the resin molded article may be a resin molded article of a single-layer structure formed only of a layer formed from the polyamide-based resin composition (hereinafter referred to as "polyamide layer"), but from the viewpoint of enhancing gas barrier properties, may be a resin molded article of a laminated structure having a barrier layer on at least one surface of the polyamide layer. In the case of the resin molded article of the laminated structure having the barrier layer, resins for forming barrier layers are often inferior in flexibility and moisture resistance, and hence it is preferred that the resin molded article have a layer formed of a thermoplastic resin excellent in flexibility and moisture resistance on the opposite surface of the barrier layer having the polyamide layer.

Examples of the resin for forming the barrier layer include polyvinyl alcohol, polyamide MXD6, polyacrylonitrile, and polyvinylidene chloride.

Examples of the thermoplastic resin for forming the layer on the opposite surface of the barrier layer having the polyamide layer include the above-mentioned ones.

In addition, as required, a layer obtained from the above-mentioned adhesive resin may be added.

When a polyester-based resin composition containing the polyester-based resin (A3), such as polybutylene terephthalate, is used, the resin molded article may be a resin molded article of a single-layer structure formed only of a layer formed from the polyester-based resin composition (hereinafter referred to as "polyester layer"), but from the viewpoint of enhancing gas barrier properties, may be a resin molded article of a laminated structure having a barrier layer on at least one surface of the polyester layer. In the case of the resin molded article of the laminated structure having the barrier layer, resins for forming barrier layers are often inferior in flexibility and moisture resistance, and hence it is preferred that the resin molded article have a layer formed of a thermoplastic resin excellent in flexibility and moisture resistance on the opposite surface of the barrier layer having the polyester layer.

Examples of the resin for forming the barrier layer include polyvinyl alcohol, polyamide MXD6, polyacrylonitrile, and polyvinylidene chloride.

Examples of the thermoplastic resin for forming the layer on the opposite surface of the barrier layer having the polyester layer include the above-mentioned ones.

In addition, as required, a layer obtained from the above-mentioned adhesive resin may be added.

A method of coextruding the gas-barrier resin composition of the present invention, another gas-barrier resin, the adhesive resin, the thermoplastic resin, and the like is not particularly limited, and examples thereof may include a multi-manifold confluence T-die method, a feed-block confluence T-die method, and an inflation method.

A film and a sheet are formed from the gas-barrier resin composition. The film and the sheet formed from the resin composition are each excellent in external appearance characteristic, various gas barrier properties, impact resistance, resistance to repeated bending, and film/sheet breakage resistance. The film and the sheet encompass single-layer and multilayer ones.

The film and the sheet may each be produced by a method similar to any of those described as the method of producing the resin molded article described above. From the viewpoint of enhancing the film/sheet breakage resistance of the film and the sheet to be obtained, a method involving stretching (a uniaxial stretching step, a sequential biaxial stretching step, a simultaneous biaxial stretching step, or an inflation molding step) an unstretched film or sheet obtained through a cast molding step of melt-extruding the resin composition onto a casting roll is particularly preferred.

The single-layer or multilayer film or sheet obtained from the gas-barrier resin composition of the present invention may be used for various applications. Further, the above-mentioned film or sheet may be subjected to secondary processing to provide a film, a sheet, a tube, a bottle container, or the like. Examples of the resin molded article obtained by performing the secondary processing include: (1) a multilayer co-stretched sheet or film obtained by subjecting the single-layer or multilayer film or sheet to uniaxial or biaxial stretching and heat treatment; (2) a multilayer rolled sheet or film obtained by rolling the single-layer or multilayer film or sheet; (3) a multilayer tray cup-shaped container obtained by subjecting the single-layer or multilayer film or sheet to thermoforming processing, such as vacuum forming, pressure forming, or vacuum pressure forming; and (4) a bottle- or cup-shaped container obtained by subjecting a laminate to stretch blow molding or the like.

Specifically, the resin molded article obtained from the gas-barrier resin composition of the present invention may be suitably used for, for example, a packaging material for a food and drink, a packaging material for a pharmaceutical, a packaging material for a cosmetic, a packaging material for an industrial chemical, a packaging material for an agrochemical, a pipe for organic liquid transportation, an infusion bag for medical use, or a fuel container.

EXAMPLES

The present invention is described in more detail by way of Examples and Comparative Examples. However, the present invention is not limited to the following examples.

[Structural Analysis of Copolymer (B)]
[1] Molecular Weight Measurement

The number-average molecular weight (Mn) and weight-average molecular weight (Mw) of the copolymer (B) were calculated using a method appropriate for the solubility of the polymer out of three measurement methods described below.

1) Molecular Weight Measurement Method-1

Measurement was performed by size exclusion chromatography (solvent: 1,2-dichlorobenzene, temperature: 145° C.) using polystyrene as a molecular weight reference material with a high-temperature GPC apparatus HLC-8121GPC/HT manufactured by Tosoh Corporation including AT-806MS columns manufactured by Showa Denko K.K. (for GPC, two in series).

2) Molecular Weight Measurement Method-2

Calculation was performed by size exclusion chromatography (solvent: tetrahydrofuran, temperature: 40° C.) using polystyrene as a molecular weight reference material with a liquid chromatograph including KF-806M columns manufactured by Showa Denko K.K. (for GPC, two in series) and an SE-61RI detector manufactured by Showa Denko K.K.

3) Molecular Weight Measurement Method-3

Calculation was performed by size exclusion chromatography (solvent: methanol/water=1:1, temperature: 40° C.) using pullulan as a molecular weight reference material with a GPC apparatus Alliance e2695 manufactured by Waters Corporation including Asahipak GF-310 HQ columns manufactured by Showa Denko K.K. (two in series).

[2] Monomer Structural Unit Content

The contents of monomer structural units represented by the formula (2) and the formula (3) in the copolymer (B) were determined by $^1$H- and $^{13}$C-NMR analysis at 120° C. using 1,1,2,2-tetrachloroethane-d4 as a solvent with a nuclear magnetic resonance apparatus JNM-ECS400 manufactured by JEOL Ltd.

[Thermophysical Properties of Polymer]

The melting point, crystallization temperature, and glass transition point of a polymer were measured by a method in conformity with JIS K7121 with a differential scanning calorimeter X-DSC7000 manufactured by SII NanoTechnology Inc. About 3 mg of a powdery sample was loaded into an aluminum pan. Its temperature was first increased from 30° C. to 200° C. at a temperature increase rate of 10° C./min, and kept for 5 minutes, followed by cooling at 10° C./min to −150° C. After that, the temperature was increased at 10° C./min to 200° C. Thus, a melting curve was obtained.

[Measurement of Tensile Elastic Modulus and Breaking Elongation]

A sheet having a thickness of 1 mm was produced from each of resins of Examples and Comparative Examples by a method (cooling method A) described in JIS K7151 (1995), and was punched to produce a small test piece of form 5B described in JIS K7162 (1994), which was subjected to a tensile test in accordance with JIS K7161 (1994) to measure its tensile elastic modulus and breaking elongation. The test was performed using a tensile tester Tensilon RTG-1250 manufactured by A&D Company, Limited as a measurement apparatus under the test conditions of a temperature of 23° C., a relative humidity of 50% RH, a chuck-to-chuck distance of 21 mm, and a measurement rate of 10 mm/min.

[Measurement of Tensile Impact Strength]

1) Production Method for Test Sample

Each of the resins of Examples and Comparative Examples was placed in a mold for hot pressing having a thickness of 1 mm, and was preheated in a hot press having a surface temperature of 230° C. for 5 minutes. After that, pressurization and depressurization were repeated to melt the resin and remove the gas remaining in the molten resin. Further, the resin was pressurized and held at 4.9 MPa for 5 minutes. After that, under the state in which the pressure of 4.9 MPa was applied, the resin was gradually cooled at a rate of 10° C./min. When the temperature had been reduced to around room temperature, the molded plate was removed from the mold. The resultant molded plate was conditioned under an environment having a temperature of 23±2° C. and a relative humidity of 50±5% RH for 48 hours or more. A test piece having the shape of ASTM D1822 Type-S was punched out of the pressed plate after the conditioning, and was used as a test sample.

2) Test Conditions

The above-mentioned test piece was used and measured for its tensile impact strength with reference to Method B of JIS K7160-1996. The only difference from JIS K7160-1996 is the shape of the test piece. The test was performed by a method in conformity with JIS K7160-1996 regarding the other measurement conditions and the like.

[Oxygen Permeability Coefficient]

1) Production Method for Test Sample

Each of the resins of Examples and Comparative Examples was placed in a mold for hot pressing having a thickness of 0.3 mm, and was preheated in a hot press having a surface temperature of 230° C. for 5 minutes. After that, pressurization and depressurization were repeated to melt the resin and remove the gas remaining in the molten resin. Further, the resin was pressurized and held at 4.9 MPa for 3 minutes. After that, under the state in which the pressure of 4.9 MPa was applied, the resin was gradually cooled at a rate of 10° C./min. When the temperature had been reduced to around room temperature, the molded plate was removed from the mold. The resultant molded plate was conditioned under an environment having a temperature of 23+2° C. and a humidity of 50±5% RH for 48 hours or more. A circular test piece having a diameter of 5.5 cm was produced from the pressed plate after the conditioning, and was used as a test sample.

2) Test Conditions

The oxygen permeation amount of the test sample was measured by a differential pressure method in conformity with JIS K7126 (2006) with a differential pressure-type gas/water vapor permeability measurement apparatus (differential pressure-type gas permeation apparatus: "GTR-30XAD2" manufactured by GTR TEC Corporation, gas chromatography detector: "G2700T•F" manufactured by Yanaco Technical Science) under the conditions of a temperature of 26° C. or 40° C., a relative humidity of 0% RH or 90% RH, and a permeation area of 15.2 cm$^2$. An oxygen permeability coefficient was calculated using the following equation.

Oxygen permeability coefficient (cm$^3$·cm/cm$^2$·s·Pa)
={oxygen permeation amount (cm$^3$)×sample thickness (cm)}/{permeation area (cm$^2$)× time (s)×oxygen partial pressure difference (Pa)}

The details of vinyl alcohol-based resins (A1), a polyamide-based resin (A2), a polyester-based resin (A3), copolymers (B), and other polymers (C) used in Examples and Comparative Examples are described below.

<Vinyl Alcohol-based Resin (A1)>

Ethylene-vinyl alcohol copolymer (A1-1) (hereinafter abbreviated as EVOH (A1-1)): manufactured by Kuraray Co., Ltd., product name: EVAL (trademark) F101B, ethylene content: 32 mol %, vinyl alcohol content: 68 mol %

Ethylene-vinyl alcohol copolymer (A1-2) (hereinafter abbreviated as EVOH (A1-2)): manufactured by The Nippon Synthetic Chemical Industry Co., Ltd., product name: SoarnoL (trademark) A4412, ethylene content: 44 mol %, vinyl alcohol content: 56 mol %

<Polyamide-based Resin (A2)>

Polyamide-based resin (A2-1) (hereinafter abbreviated as polyamide (A2-1)): manufactured by Mitsubishi Gas Chemical Company, Inc., 56007, polyamide MXD6

<Polyester-based Resin (A3)>

Polyester-based resin (A3-1) (hereinafter abbreviated as polyester (A3-1)): manufactured by Mitsubishi Engineering-Plastics Corporation, product name: NOVADURAN (trademark) 5008, polybutylene terephthalate <Copolymer (B)>

Ethylene-allyl alcohol copolymer (B-1) (hereinafter abbreviated as copolymer (B-1)): number-average molecular weight Mn=46,000, weight-average molecular weight Mw=70,000, Mw/Mn=1.53, allyl alcohol content: 18 mol % ($R^1$=H, n=0, {(m+n)/(l+m+n)}×100=18, {m/(m+n)}×100=100)

Ethylene-allyl alcohol copolymer (B-2) (hereinafter abbreviated as copolymer (B-2)): number-average molecular weight Mn=4,700, weight-average molecular weight Mw=7,600, Mw/Mn=1.57, allyl alcohol content: 41 mol % ($R^1$=H, n=0, {(m+n)/(l+m+n)}×100=41, {m/(m+n)}×100=100)

<Other Polymer (C)>

Ethylene-vinyl alcohol copolymer (C-1) (hereinafter abbreviated as polymer (C-1)): manufactured by Tosoh Corporation, product name: Melthene (trademark) H-6051, vinyl alcohol content: 9.3 mol %

Ethylene-propylene-1-hexene copolymer (C-2) (hereinafter abbreviated as polymer (C-2)): manufactured by Japan Polyethylene Corporation, product name: KERNEL (trademark) KJ640T Ethylene-methyl acrylate copolymer (C-3) (hereinafter abbreviated as polymer (C-3)): manufactured by Japan Polyethylene Corporation, product name: Rexpearl (trademark) EB440H Synthesis Examples of the copolymers (B-1) and (B-2) are shown below.

Synthesis Example 1: Synthesis of Copolymer (B-1)

Under a nitrogen gas atmosphere, in a 2 L autoclave, to allyl acetate (1 L) filled with an ethylene gas (0.5 MPa) at 65° C., a solution (40 mL) of the following metal complex catalyst (1.0 g, 1.4 mmol, described in laid-open publication: JP 2014-159540 A)

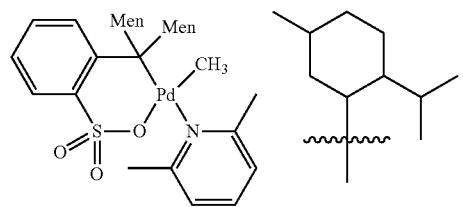

Men = Methyl in toluene was added, and the mixture was stirred at 65° C. for 30 hours. The ethylene gas was purged with a nitrogen gas, and after having been cooled to room temperature, the reaction liquid in the autoclave was concentrated to about 100 mL under reduced pressure. The concentrated liquid was added to methanol (1 L) to precipitate a polymer. The resultant polymer was collected by filtration, washed with methanol, and then dried under reduced pressure to provide an ethylene-allyl acetate copolymer. The yield was 13.3 g. The number-average molecular weight and the weight-average molecular weight were calculated to be 49,000 and 90,000, respectively, by the molecular weight measurement method-1, and hence the ratio Mw/Mn was 1.84. Differential scanning calorimetry found a melting point of 50.1° C., a crystallization temperature of 33.5° C., and a glass transition point of −41.8° C. With regard to the allyl acetate content in the copolymer, the molar proportions of ethylene:allyl acetate were determined to be 82.0:18.0 (allyl acetate molar fraction=18.0%) by $^1$H-NMR and $^{13}$C-NMR measurement.

Subsequently, the obtained ethylene-allyl acetate copolymer was subjected to a saponification reaction. Under a nitrogen gas atmosphere, a solution (10 mL) of sodium hydroxide (manufactured by Wako Pure Chemical Industries, Ltd., 0.088 g, 2.2 mmol) in methanol was added to a 1 L separable recovery flask containing the ethylene-allyl acetate copolymer (10.3 g), toluene (140 mL), and methanol (75 mL), and the mixture was stirred under heating to reflux for 2.5 hours. After having been cooled to room temperature, the reaction liquid was added to methanol (1 L) to precipitate a polymer. The resultant polymer was collected by filtration, washed with methanol, and then dried under reduced pressure to provide the copolymer (B-1), which was an ethylene-allyl alcohol copolymer. The yield was 8.1 g. The number-average molecular weight and the weight-average molecular weight were calculated to be 46,000 and 70,000, respectively, by the molecular weight measurement method-2, and hence the ratio Mw/Mn was 1.53. Differential scanning calorimetry found a melting point of 67.4° C., a crystallization temperature of 47.8° C., and a glass transition point of 4.3° C. With regard to the allyl alcohol content in the copolymer, the molar proportions of ethylene:allyl alcohol were determined to be 82.0:18.0 (allyl alcohol molar fraction=18.0%) by $^1$H-NMR and $^{13}$C-NMR measurement.

Synthesis Example 2: Synthesis of Copolymer (B-2)

Under a nitrogen gas atmosphere, in a 2 L autoclave, a solution (90 mL) of the same metal complex catalyst (0.69 g, 1.00 mmol) as that used in Synthesis Example 1 in allyl acetate was added to allyl acetate (1.0 L) filled with an ethylene gas (0.12 MPa) at 40° C., and the mixture was stirred at 40° C. for 90 hours. The ethylene gas was purged with a nitrogen gas, and after having been cooled to room temperature, the reaction liquid in the autoclave was concentrated under reduced pressure to provide an ethylene-allyl acetate copolymer. The yield was 9.0 g. The number-average molecular weight and the weight-average molecular weight were calculated to be 7,100 and 11,000, respectively, by the molecular weight measurement method-1, and hence the ratio Mw/Mn was 1.55. The glass transition point was found to be −37.0° C. by differential scanning calorimetry, and the melting point and the crystallization temperature were not observed. With regard to the allyl acetate content in the copolymer, the molar proportions of ethylene:allyl acetate were determined to be 60.0:40.0 (allyl acetate molar fraction=40.0%) by $^1$H-NMR and $^{13}$C-NMR measurement.

Subsequently, the obtained ethylene-allyl acetate copolymer was subjected to a saponification reaction. Under a nitrogen gas atmosphere, a solution (10 mL) of sodium hydroxide (manufactured by Wako Pure Chemical Industries, Ltd., 0.075 g, 1.9 mmol) in methanol was added to a 1 L separable recovery flask containing the ethylene-allyl acetate copolymer (5.3 g), toluene (120 mL), and methanol (65 mL), and the mixture was stirred under heating to reflux for 3 hours. After having been cooled to room temperature, the reaction liquid was added to a water-acetone mixed solvent (1:1 vol/vol, 1 L) to precipitate a polymer. The resultant polymer was collected by filtration, washed with methanol, and then dried under reduced pressure to provide the copolymer (B-2), which was an ethylene-allyl alcohol copolymer. The yield was 3.0 g. The number-average molecular weight and the weight-average molecular weight were calculated to be 4,800 and 7,600, respectively, by the molecular weight measurement method-3, and hence the ratio Mw/Mn was 1.57. The glass transition point was found to be 15.0° C. by differential scanning calorimetry, and the melting point and the crystallization temperature were not observed. With regard to the allyl alcohol content in the copolymer, the molar proportions of ethylene:allyl alcohol were determined to be 60.0:40.0 (allyl alcohol molar fraction=40.0%) by $^1$H-NMR and $^{13}$C-NMR measurement.

Example 1-1

80 mass % of the EVOH (A1-1) and 20 mass % of the copolymer (B-1) were blended, and were loaded into the hopper of a twin-screw kneading extruder (small kneading machine manufactured by Xplore Instruments) that had been heated to a cylinder temperature of 220° C. Melt kneading was performed at a screw speed of 100 rpm for 3 minutes, and then a molten composition flowing out of a die was cooled and then cut to produce a pelletized vinyl alcohol-based resin composition 1-1. The resultant resin composition 1-1 was subjected to the tensile test, the tensile impact test, and the gas barrier property (oxygen permeability coefficient) evaluation by the above-mentioned methods. The measurement results are shown in Table 2.

Example 1-2

A vinyl alcohol-based resin composition 1-2 was produced by the same method as that of Example 1-1 except for changing the blending ratio of the EVOH (A1-1) and the copolymer (B-1), and was subjected to the tensile test, the tensile impact test, and the gas barrier property evaluation. The measurement results are shown in Table 2.

Example 1-3

A vinyl alcohol-based resin composition 1-3 was produced by the same method as that of Example 1-1 except for using the copolymer (B-2) in place of the copolymer (B-1), and was subjected to the tensile test, the tensile impact test, and the gas barrier property evaluation. The measurement results are shown in Table 2.

Comparative Example 1-1

A vinyl alcohol-based resin composition 1-4 was produced by the same method as that of Example 1-1 except for using only the EVOH (A1-1) without adding the copolymer (B-1), and was subjected to the tensile test, the tensile impact test, and the gas barrier property evaluation. However, the resin composition was brittle, and hence a sample for the tensile impact test was not able to be produced. The measurement results are shown in Table 2.

Comparative Examples 1-2 to 1-4

Vinyl alcohol-based resin compositions 1-5 to 1-7 were produced by the same method as that of Example 1-1 except for using the polymer (C-1) in place of the copolymer (B-1) and adopting a blending ratio shown in Table 2, and were subjected to the tensile test, the tensile impact test, and the gas barrier property evaluation. The measurement results are shown in Table 2.

Comparative Example 1-5

A vinyl alcohol-based resin composition 1-8 was produced by the same method as that of Example 1 except for using the polymer (C-2) in place of the copolymer (B-1), and was subjected to the tensile test, the tensile impact test, and the gas barrier property evaluation. The measurement results are shown in Table 2.

Comparative Example 1-6

A vinyl alcohol-based resin composition 1-9 was produced by the same method as that of Example 1 except for using the polymer (C-3) in place of the copolymer (B-1), and was subjected to the tensile test, the tensile impact test, and the gas barrier property evaluation. The measurement results are shown in Table 2.

TABLE 2

| | | | Resin composition (mass %) | | | | | | Physical property value | | | | |
| --- | --- | --- | --- | --- | --- | --- | --- | --- | --- | --- | --- | --- | --- |
| | | | Vinyl alcohol-based resin (A1) EVOH | Copolymer (B) | | Other polymer (C) | | | Tensile test (23° C., 50% RH) | | Impact resistance Tensile impact strength | Oxygen permeability coefficient ($cm^3 \cdot cm/cm^2 \cdot s \cdot Pa$) | |
| | | Vinyl alcohol-based resin composition | | | | | | | Tensile elastic modulus (MPa) | Breaking elongation (%) | | | |
| | | | (A1-1) | (B-1) | (B-2) | (C-1) | (C-2) | (C-3) | | | (kJ/m$^2$) | 26° C., dry | 40° C., 90% RH |
| Example | 1-1 | 1-1 | 80 | 20 | 0 | 0 | 0 | 0 | 1,404 | 12 | 40 | $1.91 \times 10^{-17}$ | $7.77 \times 10^{-16}$ |
| | 1-2 | 1-2 | 70 | 30 | 0 | 0 | 0 | 0 | 1,112 | 9 | 18 | $2.13 \times 10^{-17}$ | $8.67 \times 10^{-16}$ |
| | 1-3 | 1-3 | 80 | 0 | 20 | 0 | 0 | 0 | 1,624 | 12 | 35 | $1.53 \times 10^{-17}$ | $9.15 \times 10^{-16}$ |
| Comparative Example | 1-1 | 1-4 | 100 | 0 | 0 | 0 | 0 | 0 | 2,048 | 4 | Sample unable to be produced | $1.51 \times 10^{-17}$ | $9.25 \times 10^{-16}$ |
| | 1-2 | 1-5 | 90 | 0 | 0 | 10 | 0 | 0 | 1,951 | 6 | 21 | $8.58 \times 10^{-17}$ | $2.54 \times 10^{-16}$ |
| | 1-3 | 1-6 | 80 | 0 | 0 | 20 | 0 | 0 | 1,623 | 5 | 8 | $1.68 \times 10^{-16}$ | $4.90 \times 10^{-16}$ |

TABLE 2-continued

| | Vinyl alcohol- based resin compo- sition | Resin composition (mass %) | | | | | | Physical property value | | | | |
| | | | | | | | | Tensile test (23° C., 50% RH) | | Impact resistance Tensile impact strength (kJ/m$^2$) | Oxygen permeability coefficient (cm$^3$ · cm/cm$^2$ · s · Pa) | |
| | | Vinyl alcohol- based resin (A1) EVOH | Copolymer (B) | | Other polymer (C) | | | Tensile elastic modulus (MPa) | Break- ing elon- gation (%) | | | |
| | | (A1-1) | (B-1) | (B-2) | (C-1) | (C-2) | (C-3) | | | | 26° C., dry | 40° C., 90% RH |
| 1-4 | 1-7 | 70 | 0 | 0 | 30 | 0 | 0 | 1,463 | 3 | 5 | 2.12 × 10$^{-16}$ | 3.70 × 10$^{-16}$ |
| 1-5 | 1-8 | 80 | 0 | 0 | 0 | 20 | 0 | 1,391 | 10 | 11 | 1.39 × 10$^{-16}$ | 3.74 × 10$^{-15}$ |
| 1-6 | 1-9 | 80 | 0 | 0 | 0 | 0 | 20 | 1,315 | 13 | 21 | 2.44 × 10$^{-16}$ | 4.79 × 10$^{-15}$ |

It was found from the results of Examples 1-1 to 1-3 and Comparative Example 1-1 that the resin compositions of the present invention each containing the copolymer (B) had high flexibility and impact resistance as compared to the resin composition containing no copolymer (B). In addition, it was also revealed that the resin compositions of the present invention did not impair excellent oxygen barrier properties of the vinyl alcohol-based resin (A1).

As apparent from the results of Comparative Examples 1-2 to 1-6, the resin compositions having mixed therein the other polymers (C) also showed improvements in flexibility and impact resistance as compared to the resin composition of Comparative Example 1-1, but had smaller improving effects as compared to the resin compositions of the present invention. Further, each of the resin compositions impaired excellent oxygen barrier properties of the vinyl alcohol-based resin (A1). Therefore, it can be said that the resin compositions of the present invention are more excellent.

Next, vinyl alcohol-based resin compositions were produced and evaluated using the ethylene-vinyl alcohol copolymer EVOH (A1-2) having an ethylene content of 44 mol % and a vinyl alcohol content of 56 mol % as the vinyl alcohol-based resin (A1).

Examples 1-4 and 1-5, and Comparative Examples 1-7 and 1-8

Vinyl alcohol-based resin compositions 1-10 to 1-13 were produced by the same method as that of Example 1-1 except for using the EVOH (A1-2) in place of the EVOH (A1-1) and blending other components as shown in Table 3, and were subjected to the tensile test, the tensile impact test, and the gas barrier property evaluation. The measurement results are shown in Table 3.

TABLE 3

| | | Vinyl alcohol- based resin compo- sition | Resin composition (mass %) | | | | Physical property value | | | | |
| | | | | | | | Tensile test (23° C., 50% RH) | | Impact resistance Tensile impact strength (kJ/m$^2$) | Oxygen permeability coefficient (cm$^3$ · cm/cm$^2$ · s · Pa) | |
| | | | Vinyl alcohol- based resin (A1) EVOH | Copolymer (B) | | Other polymer (C) | Tensile elastic modulus (MPa) | Break- ing elon- gation (%) | | | |
| | | | (A1-2) | (B-1) | (B-2) | (C-1) | | | | 26° C., dry | 40° C., 90% RH |
| Example | 1-4 | 1-10 | 80 | 20 | 0 | 0 | 1,081 | 156 | 49 | 2.77 × 10$^{-16}$ | 8.04 × 10$^{-16}$ |
| | 1-5 | 1-11 | 80 | 0 | 20 | 0 | 1,403 | 213 | 55 | 2.10 × 10$^{-16}$ | 1.24 × 10$^{-16}$ |
| Comparative | 1-7 | 1-12 | 100 | 0 | 0 | 0 | 1,734 | 3 | 19 | 2.44 × 10$^{-16}$ | 1.67 × 10$^{-15}$ |
| Example | 1-8 | 1-13 | 80 | 0 | 0 | 20 | 1,252 | 5 | 33 | 6.38 × 10$^{-16}$ | 2.82 × 10$^{-16}$ |

It was found from the results of Examples 1-4 and 1-5, and Comparative Example 1-1 that, even when the vinyl alcohol-based resin (A1) was the EVOH (A1-2) having different ethylene and vinyl alcohol contents, the resin compositions of the present invention had high toughness and impact resistance as compared to the resin composition containing no copolymer (B), and did not impair excellent oxygen barrier properties of the vinyl alcohol-based resin (A1).

As apparent from the results of Comparative Example 1-8, the resin composition having mixed therein the other polymer (C-1) showed an improvement in impact resistance, but showed no improvement in flexibility as compared to the resin composition of Comparative Example 1-1. In addition, the resin composition showed reductions in oxygen barrier properties.

Example 2-1

80 mass % of the polyamide (A2-1) and 20 mass % of the copolymer (B-1) were blended, and were loaded into the hopper of a twin-screw kneading extruder (small kneading machine manufactured by Xplore Instruments) that had been heated to a cylinder temperature of 280° C. Melt kneading was performed at a screw speed of 100 rpm for 2 minutes, and then a molten composition flowing out of a die was cooled and then cut to produce a pelletized polyamide-based resin composition 2-1.

The resultant resin composition 2-1 was subjected to the tensile test, the tensile impact test, and the gas barrier property (oxygen permeability coefficient) evaluation by the above-mentioned methods. The measurement results are shown in Table 4.

Example 2-2

A pelletized polyamide-based resin composition 2-2 was produced in the same manner as in Example 2-1 except for using the copolymer (B-2) in place of the copolymer (B-1), and was subjected to the tensile test, the tensile impact test, and the gas barrier property evaluation. The measurement results are shown in Table 4.

Comparative Example 2-1

A polyamide-based resin composition 2-2 was produced by the same method as that of Example 2-1 except for using only the polyamide (A2-1) without adding the copolymer (B-1), and was subjected to the tensile test, the tensile impact test, and the gas barrier property evaluation. The measurement results are shown in Table 4.

Comparative Example 2-2

A polyamide-based resin composition 2-3 was produced by the same method as that of Example 2-1 except for using the polymer (C-1) in place of the copolymer (B-1), and was subjected to the tensile test, the tensile impact test, and the gas barrier property evaluation. The measurement results are shown in Table 4.

having kneaded therein the copolymer (B) was more excellent in flexibility, ease of elongation, impact resistance, and gas barrier properties as compared to the polyamide-based resin composition having kneaded therein the other polymer (C).

Example 3-1

80 mass % of the polyester (A3-1) and 20 mass % of the copolymer (B-1) were blended, and were loaded into the hopper of a twin-screw kneading extruder (small kneading machine manufactured by Xplore Instruments) that had been heated to a cylinder temperature of 250° C. Melt kneading was performed at a screw speed of 100 rpm for 2 minutes, and then a molten composition flowing out of a die was cooled and then cut to produce a pelletized polyester-based resin composition 3-1.

The resultant resin composition 3-1 was subjected to the tensile test, the tensile impact test, and the gas barrier property (oxygen permeability coefficient) evaluation by the above-mentioned methods. The measurement results are shown in Table 5.

Example 3-2

A pelletized polyester-based resin composition 3-2 was produced in the same manner as in Example 3-1 except for using the copolymer (B-2) in place of the copolymer (B-1), and was subjected to the tensile test, the tensile impact test, and the gas barrier property evaluation. The measurement results are shown in Table 5.

Comparative Example 3-1

A polyester-based resin composition 3-3 was produced by the same method as that of Example 3-1 except for using

TABLE 4

| | | | Resin composition (mass %) | | | | Physical property value | | | | |
|---|---|---|---|---|---|---|---|---|---|---|---|
| | | | | | | | Tensile test (23° C., 50% RH) | | Impact resistance | | |
| | | Polyamide-based resin composition | Polyamide (A2) | Copolymer (B) | | Other polymer (C) | Tensile elastic modulus | Breaking elongation | Tensile impact strength | Oxygen permeability coefficient ($cm^3 \cdot cm/cm^2 \cdot s \cdot Pa$) | |
| | | | (A2-1) | (B-1) | (B-2) | (C-1) | (MPa) | (%) | (kJ/m$^2$) | 26° C., dry | 40° C., 90% RH |
| Example | 2-1 | 2-1 | 80 | 20 | | 0 | 1,633 | 12 | 14 | $4.23 \times 10^{-16}$ | $8.77 \times 10^{-16}$ |
| | 2-2 | 2-2 | 80 | | 20 | | 1,644 | 2.4 | 4 | $3.97 \times 10^{-16}$ | $9.31 \times 10^{-16}$ |
| Comparative Example | 2-1 | 2-3 | 100 | 0 | | 0 | 2,590 | 2.1 | 3 | $4.16 \times 10^{-16}$ | $9.62 \times 10^{-16}$ |
| | 2-2 | 2-4 | 80 | 0 | | 20 | 1,751 | 4 | 6 | $1.14 \times 10^{-15}$ | $3.04 \times 10^{-15}$ |

It was found from the results of Example 2-1, Example 2-2, and Comparative Example 2-1 that the polyamide-based resin compositions of the present invention each containing the copolymer (B) were excellent in flexibility, ease of elongation, and impact resistance as compared to the polyamide-based resin composition containing no copolymer (B). That is, kneading with the copolymer (B) was able to modify the polyamide-based resin (A2). In addition, it was also revealed that the kneading with the copolymer (B) did not impair excellent gas barrier properties of the polyamide-based resin (A2).

In addition, a comparison between the results of Example 2-1 and Comparative Example 2-2 made it clear that the polyamide-based resin composition of the present invention only the polyester (A3-1) without adding the copolymer (B-1), and was subjected to the tensile test, the tensile impact test, and the gas barrier property evaluation. The measurement results are shown in Table 5.

Comparative Example 3-2

A polyester-based resin composition 3-4 was produced by the same method as that of Example 3-1 except for using the polymer (C-1) in place of the copolymer (B-1), and was subjected to the tensile test, the tensile impact test, and the gas barrier property evaluation. The measurement results are shown in Table 5.

TABLE 5

| | Resin composition (mass %) | | | | Physical property value | | | | |
|---|---|---|---|---|---|---|---|---|---|
| | | | | | Tensile test (23° C., 50% RH) | | Impact resistance | Oxygen permeability coefficient ($cm^3 \cdot cm/cm^2 \cdot s \cdot Pa$) | |
| | Polyester-based resin composition | Polyester (A3) | Copolymer (B) | | Other polymer (C) | Tensile elastic modulus (MPa) | Breaking elongation (%) | Tensile impact strength ($kJ/m^2$) | |
| | | (A3-1) | (B-1) | (B-2) | (C-1) | | | | 26° C., dry | 40° C., 90% RH |
| Example 3-1 | 3-1 | 80 | 20 | | 0 | 955 | 30.0 | 6.1 | $4.23 \times 10^{-15}$ | $3.81 \times 10^{-15}$ |
| Example 3-2 | 3-2 | 80 | | 20 | | 958 | 8.6 | 10.0 | $3.34 \times 10^{-15}$ | $3.66 \times 10^{-15}$ |
| Comparative Example 3-1 | 3-3 | 100 | 0 | | 0 | 1,648 | 3.1 | 3.2 | $3.17 \times 10^{-15}$ | $3.52 \times 10^{-15}$ |
| Comparative Example 3-2 | 3-4 | 80 | 0 | | 20 | 1,235 | 4.5 | 5.7 | $4.88 \times 10^{-15}$ | $5.16 \times 10^{-15}$ |

It was found from the results of Example 3-1, Example 3-2, and Comparative Example 3-1 that the polyester-based resin compositions of the present invention each containing the copolymer (B) were excellent in flexibility, ease of elongation, and impact resistance as compared to the polyester-based resin composition containing no copolymer (B). That is, kneading with the copolymer (B) was able to modify the polyester-based resin (A3) while hardly deteriorating the gas barrier properties.

In addition, a comparison between the results of Example 3-1 and Comparative Example 3-2 made it clear that the polyester-based resin composition of the present invention having kneaded therein the copolymer (B) was more excellent in flexibility, ease of elongation, impact resistance, and gas barrier properties as compared to the polyester-based resin composition having kneaded therein the other polymer (C).

The invention claimed is:

1. A gas-barrier resin composition, comprising: a gas-barrier resin (A) having an oxygen permeability coefficient of $1.0 \times 10^{-14}$ ($cm^3 \cdot cm/cm^2 \cdot s \cdot Pa$) or less wherein said gas-barrier resin (A) is a vinyl alcohol-based resin (A1); and a copolymer (B) containing monomer structural units represented by the formula (1), the formula (2), and the formula (3):

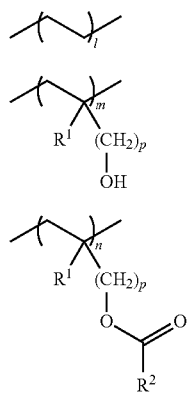

wherein $R^1$ represents a hydrogen atom or a methyl group; $R^2$ represents a hydrocarbon group having 1 to 20 carbon atoms that may be substituted with a halogen atom, a hydroxy group, an alkoxy group, or an amino group; l, m, and n represent numerical values representing molar proportions of the respective monomer structural units, and n may represent 0; and p represents an integer of from 1 to 4, wherein a ratio of a mass of the copolymer (B) to a total mass of the gas-barrier resin (A) and the copolymer (B) is from 1 mass % to 40 mass %, wherein, in the copolymer (B), the molar proportion l of the monomer structural unit represented by the formula (1), the molar proportion m of the monomer structural unit represented by the formula (2), and the molar proportion n of the monomer structural unit represented by the formula (3) satisfy the following expression:

$$50 \geq \{(m+n)/(l+m+n)\} \times 100 \geq 5.$$

2. The gas-barrier resin composition according to claim 1, wherein the hydrocarbon group having 1 to 20 carbon atoms represented by $R^2$ is an alkyl group having 1 to 20 carbon atoms or an aryl group having 6 to 20 carbon atoms.

3. The gas-barrier resin composition according to claim 1, wherein, in the copolymer (B), the molar proportion m of the monomer structural unit represented by the formula (2) and the molar proportion n of the monomer structural unit represented by the formula (3) satisfy the following expression: $100 \geq \{m/(m+n)\} \times 100 \geq 50$.

4. The gas-barrier resin composition according to claim 1, wherein, in the monomer structural unit represented by the formula (3) in the copolymer (B), n=0.

5. The gas-barrier resin composition according to claim 1, wherein the copolymer (B) has a number-average molecular weight (Mn) of from 1,000 to 1,000,000, and a ratio Mw/Mn between a weight-average molecular weight (Mw) and the number-average molecular weight (Mn) of from 1.5 to 4.0.

6. The gas-barrier resin composition according claim 1, wherein, in the formula (2) and the formula (3), $R^1$ represents a hydrogen atom and p represents 1.

7. The gas-barrier resin composition according to claim 1, wherein the vinyl alcohol-based resin (A1) is an ethylene-vinyl alcohol-based copolymer containing 10 mol % to 60 mol % of an ethylene structural unit.

8. A container, comprising, as a barrier layer, the gas-barrier resin composition of claim 1.

9. A resin molded article, which is obtained by molding the gas-barrier resin composition of claim 1.

10. The resin molded article according to claim 9, wherein the molding is an injection molding method or an extrusion molding method.

11. The resin molded article according to claim 9, wherein the resin molded article is any one of a sheet, a film, a tube, a pipe, a bottle, or a tank.

12. A method of modifying a gas-barrier resin, comprising mixing a copolymer containing monomer structural units represented by the formula (1), the formula (2), and the formula (3):

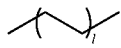 (1)

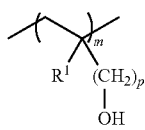 (2)

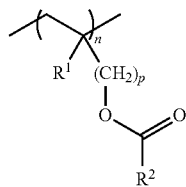 (3)

wherein $R^1$ represents a hydrogen atom or a methyl group; $R^1$ represents a hydrocarbon group having 1 to 20 carbon atoms that may be substituted with a halogen atom, a hydroxy group, an alkoxy group, or an amino group; l, m, and n represent numerical values representing molar proportions of the respective monomer structural units, and n may represent 0; and p represents an integer of from 1 to 4, into a gas-barrier resin (A) having an oxygen permeability coefficient of $1.0 \times 10^{-14}$ (cm$^3$·cm/cm$^2$·s·Pa) or less, wherein said gas-barrier resin (A) is a vinyl alcohol-based resin (A1), wherein, in the copolymer, the molar proportion l of the monomer structural unit represented by the formula (1), the molar proportion m of the monomer structural unit represented by the formula (2), and the molar proportion n of the monomer structural unit represented by the formula (3) satisfy the following expression:

$50 \geq \{(m+n)/(l+m+n)\} \times 100 \geq 5$.

* * * * *